United States Patent
Theodore (10) Patent No.: US 10,190,547 B2
(45) Date of Patent: *Jan. 29, 2019

(54) PARTIAL FORCED INDUCTION SYSTEM

(71) Applicant: Chris P. Theodore, Birmingham, MI (US)

(72) Inventor: Chris P. Theodore, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,385

(22) Filed: Jan. 22, 2018

(65) Prior Publication Data

US 2018/0142651 A1    May 24, 2018

Related U.S. Application Data

(63) Continuation of application No. 14/581,711, filed on Dec. 23, 2014, now Pat. No. 9,874,182.

(60) Provisional application No. 61/925,909, filed on Jan. 10, 2014, provisional application No. 61/921,272, filed on Dec. 27, 2013.

(51) Int. Cl.
*F02B 33/44* (2006.01)
*F02M 35/10* (2006.01)
*F02M 35/108* (2006.01)

(52) U.S. Cl.
CPC .. *F02M 35/10163* (2013.01); *F02M 35/1085* (2013.01); *Y02T 10/144* (2013.01)

(58) Field of Classification Search
CPC ........... F02M 35/10163; F02M 35/104; F02M 35/1085; F02B 31/08
USPC .......................................................... 60/611
See application file for complete search history.

(56) References Cited

U.S. PATENT DOCUMENTS

| | | | | |
|---|---|---|---|---|
| 4,900,343 A | * | 2/1990 | Minami | F02B 33/44 55/318 |
| 5,653,202 A | * | 8/1997 | Ma | F02B 17/00 123/184.43 |
| 5,762,036 A | | 6/1998 | Verkleeren | |
| 6,055,966 A | | 5/2000 | Zentgraf | |
| 6,474,275 B1 | | 11/2002 | Drecq | |
| 6,553,959 B2 | * | 4/2003 | Xu | F02B 17/005 123/295 |
| 7,451,597 B2 | * | 11/2008 | Kojima | F02B 29/0418 60/605.1 |
| 2005/0198957 A1 | | 9/2005 | Kim | |
| 2006/0168994 A1 | | 8/2006 | Tadano et al. | |
| 2008/0077304 A1 | | 3/2008 | Suzuki et al. | |

(Continued)

FOREIGN PATENT DOCUMENTS

CN    202451314 U    9/2012
CN    102787906 A    11/2012
(Continued)

*Primary Examiner* — Ngoc T Nguyen
(74) *Attorney, Agent, or Firm* — Avery N. Goldstein; Blue Filament Law PLLC (57) ABSTRACT

A partial forced induction system is provided that has one or more combustion engine cylinders with each engine cylinder having a first and a second intake valve with individual ports. A source of forced induction in fluid communication with the one or more combustion engine cylinders and urging air into the one or more combustion engine cylinders. A naturally aspirated intake manifold path connecting to each of the first intake valves at each of said one or more engine cylinders. A forced induction intake manifold path connects the source of forced induction to each of said second intake valves at each of the one or more engine cylinders.

11 Claims, 8 Drawing Sheets

(56) References Cited

U.S. PATENT DOCUMENTS

| | | |
|---|---|---|
| 2010/0152992 A1 | 6/2010 | Burkhardt |
| 2011/0209690 A1 | 9/2011 | Ulrey et al. |
| 2012/0042849 A1 | 2/2012 | Sangkyu et al. |
| 2012/0052835 A1 | 3/2012 | Bull et al. |
| 2013/0035109 A1 | 2/2013 | Tsruya et al. |
| 2013/0053067 A1 | 2/2013 | Aggarwal et al. |
| 2013/0143593 A1 | 6/2013 | Wirola et al. |
| 2013/0152581 A1 | 6/2013 | Lofgren et al. |
| 2013/0255647 A1 | 10/2013 | Akashi |
| 2013/0280032 A1 | 10/2013 | Stump et al. |
| 2013/0287564 A1 | 10/2013 | Fath et al. |
| 2013/0291540 A1 | 11/2013 | Serres et al. |
| 2013/0295952 A1 | 11/2013 | Chao et al. |
| 2013/0305708 A1 | 11/2013 | Zahdeh et al. |
| 2015/0114350 A1 | 4/2015 | Pursifull |

FOREIGN PATENT DOCUMENTS

| | | | |
|---|---|---|---|
| CN | 102877898 A | 1/2013 | |
| CN | 103195556 A | 7/2013 | |
| DE | 102007033175 A1 | 1/2009 | |
| DE | 102009014916 A1 | 9/2010 | |
| EP | 1063413 A2 * | 12/2000 | ....... F02M 35/10163 |
| GB | 2490106 A | 10/2012 | |
| JP | S57157014 A | 9/1982 | |
| JP | 2001295673 A | 10/2001 | |
| JP | 2013137005 A | 7/2013 | |
| KR | 20010066029 A | 7/2001 | |
| KR | 20130086227 A | 7/2013 | |
| MX | 2011013118 A | 2/2012 | |
| MX | 2011013780 A | 2/2012 | |
| WO | 0070213 A1 | 11/2000 | |
| WO | 2011123855 A2 | 10/2011 | |
| WO | 2012175944 A2 | 12/2012 | |
| WO | 2013136124 A1 | 9/2013 | |
| WO | 2013136129 A1 | 9/2013 | |
| WO | 2013149378 A1 | 10/2013 | |
| WO | 2013149382 A1 | 10/2013 | |
| WO | 2013165746 A1 | 11/2013 | |

* cited by examiner

PARTIAL FORCED INDUCTION SYSTEM

RELATED APPLICATIONS

This application is a continuation of U.S. application Ser. No. 14/581,711 filed 23 Dec. 2014, and now U.S. Pat. No. 9,874,182 B1; which in turn claims priority benefit of U.S. Provisional Application Ser. Nos. 61/925,909 filed 14 Jan. 2014; and 61/921,272 filed 27 Dec. 2013; the contents of which hereby incorporated by reference.

FIELD OF THE INVENTION

The present invention generally relates to internal combustion engines; and in particular to partial forced induction system and methods for improved engine performance and efficiency.

BACKGROUND OF THE INVENTION

Recent developments in internal combustion engine technology have simultaneously increased specific power, reduced fuel consumption, and reduced emissions. The performance improvements have been accomplished with the development of multi-valve engines, variable valve timing, direct fuel injection and application of forced induction (either supercharging, turbocharging, turbo-compounding, or a combination of supercharging and turbocharging).

Forced induction is used to increase engine power and efficiency. A forced induction engine is essentially two compressors in series. The compression stroke of the engine is the main compression that every engine has, and an additional compressor feeding into the intake of the engine makes it a forced induction engine. A compressor supplying a pressurized induction charge into the engine greatly increases the total compression ratio of the entire system, and this additional intake pressure is commonly referred to in the industry as boost.

A turbocharger relies on the volume and velocity of exhaust gases to spin (referred to herein synonymously as spool) a turbine wheel, which is connected to a compressor wheel via a common shaft. The boost pressure produced can be regulated by a system of release valves and electronic controllers. The chief benefit of a turbocharger is that it consumes less power from the engine than a supercharger; while the main drawback of a turbocharger is that engine response suffers greatly because it takes time for the turbocharger to come up to speed (referred to herein synonymously as spool up). The delay in power delivery from the turbocharger is referred to as turbo lag. Turbocharger design is inherently one of compromise in which a smaller turbocharger will spool quickly and deliver full boost pressure at low engine speeds, but boost efficiency will suffer at high engine revolutions per minute (RPM). It is appreciated that high and low values of RPM with respect to given engine are relative, with high RPM range typically being associated with acceleration of the vehicle. By way of example 3000 RPM is exemplary of a high RPM value for a conventional mid-size 6 cylinder sedan. A larger turbocharger, on the other hand, will provide improved high-RPM performance at the expense of lower RPM response. Other common design issues related to turbochargers include limited turbine lifespan, due to the high exhaust temperatures it must withstand, and the restrictive effect the turbine has upon exhaust flow. Superchargers, in contrast to turbochargers, have almost no lag time to build pressure because the compressor is always spinning proportionally to the engine speed. Superchargers are not as common as turbochargers because superchargers use the torque produced from the engine to operate; and, the torque utilized by the supercharger results in some loss in power and efficiency obtained from the engine.

An electric forced induction system utilizes an electric motor driven compressor to pressurize the intake air. By pressurizing the air available to the engine intake system, the air becomes denser, and is matched with more fuel, thereby producing increased horsepower. However, the power requirements and costs associated with electrically powering a compressor have limited commercial application of electric forced induction to-date.

Existing implementations of turbocharging, supercharging, and electric forced induction have met with growing acceptance but have limitations. For example, in turbocharging implementations, it is difficult to optimize compressor efficiency throughout the engine speed range, and that requires a compromise that accepts either lower efficiency and responsiveness at low RPMs to achieve higher efficiency at high rpm; or lower efficiency at high RPM to achieve better responsiveness and efficiency at low rpm. Turbocharging also suffers from turbo lag due to the inertial delay associated with accelerating the turbine wheels. The packaging of hot turbocharger components in the engine compartment is challenging, and there is heat transfer from the compressor to the intake charge under all operating conditions. There is also an undesirable back pressure associated with extracting exhaust heat energy with the turbocharger. In supercharging implementations, the power required to drive the supercharger—even when boost is not required (assumes a typical internal compressor by-pass) is a drain on the engine, as well as the power required to overcome supercharger inertia upon acceleration. There is unwanted heat transfer from the supercharger housing to the intake charge under all operating conditions, and additional packaging requirements for the supercharger. In addition, supercharging efficiency decreases at higher engine speeds and airflow. Electric forced induction implementations suffer from high power requirements and high costs associated with electrically powering a forced induction compressor and have limited commercial application to date.

While there have been many advances in forced induction, further improvements in combustion engine performance and efficiency are needed to meet mileage and performance requirements, while mitigating the problems and design limitations of existing implementations of forced induction. Thus, there exists a need for improved forced induction systems for improving combustion engine performance and efficiency.

SUMMARY OF THE INVENTION

A partial forced induction system is provided that has one or more combustion engine cylinders with each engine cylinder having a first and a second intake valve with individual ports. A source of forced induction in fluid communication with the one or more combustion engine cylinders and supplying air into the one or more combustion engine cylinders. A naturally aspirated intake manifold path connecting to each of the first intake valves at each of said one or more engine cylinders. A forced induction intake manifold path connects the source of forced induction to each of said second intake valves at each of the one or more engine cylinders.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein like reference numerals refer to like parts throughout the several views, and in which:

DETAILED DESCRIPTION OF THE INVENTION

The present invention has utility as partial forced induction systems and methods for improved engine performance, responsiveness, and efficiency. Embodiments of the inventive partial forced induction systems also reduce implementation costs, weight, packaging requirements, and thermal loading of an engine. Embodiments of the inventive partial forced induction systems utilize separate induction ports in multi-valve engines, by applying forced induction to only one of each cylinder's intake valves according to an on demand basis. The fundamental advantage of this inventive approach is that the compressor need not be sized to handle the entire induction airflow. According to the present invention in some embodiments, the forced air induction is actuated under all operating conditions and as such, an inventive system is readily produced that that excludes and is therefore without a forced air induction stopping mechanism. Inventive embodiments of the partial forced induction system utilize direct fuel injection, and multiple intake valves with independently variable timing. Partial Forced Induction is particularly well suited to direct cylinder injection (gas, diesel, natural gas, etc.) because fuel is injected into the entire induction charge under all operating conditions. Independently variable valve timing can be used to optimize engine performance and efficiency under all operating conditions. With normal road load conditions (i.e., when boost is not required to meet vehicle road load demands), intake valve timing can be optimized as it would in a naturally aspirated engine. However, with increased power demand, the turbocharger, supercharger or compressor create a "forced induction" port to increase engine power. With variable valve timing, the intake valve timing is changed such that the naturally aspirated valve closing precedes the timing of the "forced induction" valve such that forced induction valve has a later closing, thus "capturing" the pressurized induction charge. In this manner, a portion of the induction charge by-passes the compressor (typically a turbocharger or supercharger), and the compressor needs only to supply enough pressurized air to "pack" the induction charge to the desired pressure level.

Alternatively, in other embodiments of the inventive partial forced induction system variable valve timing is not required. An engine with a fixed valve timing configuration can take advantage of the time/transport lag associated with intake gas dynamics. Partial Forced Induction will work with intake valves that have identical timing, but will be limited at the point where the forced intake charge escapes through the naturally aspirated intake valve. One solution to this "reversion" of the forced induction incorporates check valves in the naturally aspirated ports or intake manifold runners to capture the pressurized charge, thus preventing reversion. Alternatively, a single anti-reversion check valve can be incorporated upstream of the individual naturally aspirated intake manifold runners. In either configuration, the improvements to engine performance will be comparable to the embodiments that utilize variable valve timing. Additionally, these configurations with fixed valve timing can still be used in combination with the "cam phasing" utilized on many modern engines.

In embodiments of the invention, the issue of reversion with fixed valve timing may be addressed by providing intake valves with a fixed timing differential, such that the naturally aspirated valve always closes before the "forced induction" valve. One way in which this fixed timing differential can be accomplished is by splitting the cam lobes that actuate the intake valves so that the naturally aspirated intake valve closing can precede the closing of the "forced induction" valve. This approach can still incorporate "cam phasing", as utilized on many modern engines. Note also that researchers have experimented with staggered intake valve timing in naturally aspirated engines to increase turbulence in the combustion chamber, through tumble or swirl motions, to create a "fast burn" and further improve engine efficiency. Hence, there is potential for an additional benefit using staggered intake valve timing.

Embodiments of the inventive partial forced induction systems can also incorporate a switching mechanism that is generically depicted in the accompanying drawings with respect to reference numeral 50 and illustratively includes devices such as a switching valve, a check valve or a combination thereof, such that under normal road load conditions (i.e., when boost is not required to meet vehicle road load demands), the entire induction charge by-passes the turbocharger, supercharger or compressor. However, with increased power demand, a portion of the intake charge is routed from the forced induction device. Incorporation of such a switching mechanism avoids restriction and heat transfer from the forced induction device under road load conditions; improving efficiency and responsiveness.

Embodiments of the inventive partial forced induction systems provide the following efficiency and implementation advantages for turbocharging, supercharging, and electric forced induction as follows:

In turbocharging implementations with embodiments of the inventive system there are lower parasitic losses, since the turbocharger compressor only needs to handle 70-75% of the intake charge versus a conventional turbocharging implementation. This 25-30% lower range of airflow requirements for partial turbocharging allows selection of turbocharger aspect ratio dimensions that better optimize low/high speed trade-offs. The 25-30% reduced airflow requirements with partial turbocharging yield smaller, less expensive and lighter turbochargers. In some applications, a twin-turbocharger or twin-scroll system can be replaced with a simpler single turbocharger and still provide equivalent responsiveness and performance. There is a potential for proportionately reduced intercooler size and cost due to the 25-30% lower quantities of air that pass through the turbocharger. The lower rotating inertia of a smaller turbocharger reduces turbocharger "lag", and the fact that the 100% of the exhaust flow is used to power only 70-75% of the induction flow also makes for a more responsive turbocharger. This smaller turbocharger is easier to package, and reduces thermal loads in the engine compartment. A reduction in intake air charge temperatures can be expected when a switching mechanism is incorporated, since heat transfer from the compressor only occurs under boost, and when it does, only to a portion of the intake charge.

In supercharging implementations with embodiments of the inventive system there are 25-30% lower compressed airflow requirements associated with partial forced induction that allow for a smaller, less expensive, and lighter supercharger, requiring proportionally less engine power to drive the smaller supercharger, thus reducing parasitic losses. Furthermore, a smaller supercharger has lower rotating masses and inertia, making the system even more responsive. Partial supercharging utilizing a switching mechanism reduces heat transfer to the intake charge, since heat transfer only occurs under boosted conditions, and when it does, heat is transferred to only a portion of the intake charge; consequently the intercooler size and cost may be reduced, as well as reducing packaging requirements. The proportionately smaller superchargers is made to be more efficient throughout the speed range by the present invention. The lower rotating mass of partial supercharging in some inventive embodiments allows for replacement of a by-pass system, with a clutched system, further reducing engine parasitic losses when no boost is required.

Electric forced induction implementations with embodiments of the inventive system can make electrification of the compressor commercially viable, since a 25-30% smaller compressor is required, with corresponding reduction of the electric motor sizing. The smaller compressor and electric motor translate into a reduced system cost and weight. Furthermore, the 25-30% lower range of airflow requirements for partial forced induction allow for improved optimization of the compressor sizing. Electrification using partial forced induction can further reduce parasitic losses from the engine output thereby making the system more efficient. Due to the 25-30% lower quantities of air, there is also potential for reduced intercooler size and cost. Through electrification, turbo lag can be virtually eliminated, as the electric motor driving the compressor can be switched on in anticipation of boost requirements. The smaller electrified compressor allows for package flexibility and eliminates the engine compartment thermal loads associated with turbochargers. These proportionately lower power requirements for the electrically driven compressor makes it easier to integrate the system with other electrical power systems, such as electrified stop/start, or hybrid vehicle systems.

While implementations of embodiments of the present invention are applicable to a whole range of internal combustion engines, it is exemplified herein in the following figures as applied to a conventional 4-cylinder, 4-valve (2 intake (I), 2 exhaust (E)) engine. All other configurations (3-cylinder, 4-cylinder, I6, V6, V8, etc.) are made up of the essential building blocks described herein. In this example, direct gas or diesel injection is assumed, although embodiments of partial supercharging can be applied to carbureted, or port injected engines as well.

Figure 1A:
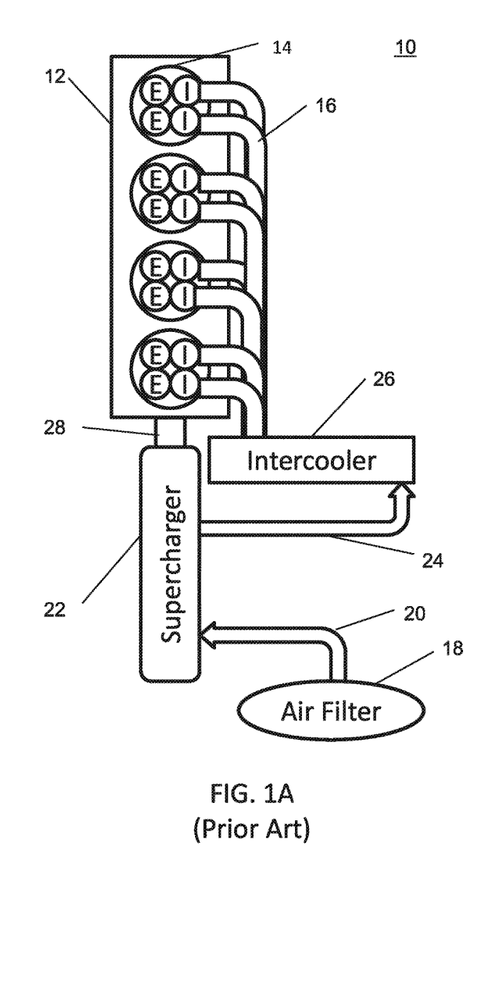
FIGS. 1A and 1B are schematic diagrams of conventional supercharger and turbocharger systems, respectively.
Figure 1B:
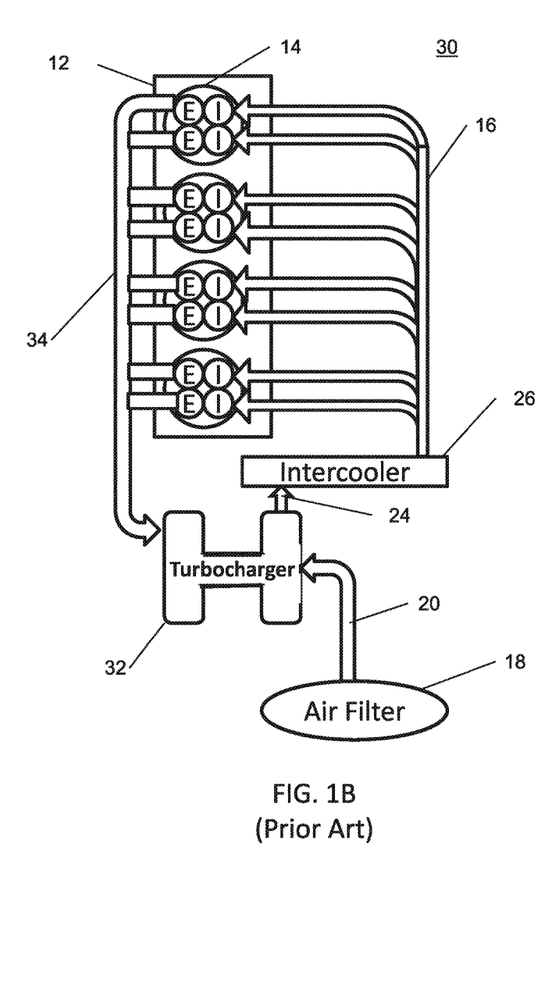

Referring now to the figures, FIGS. 1A and 1B show conventional prior art implementations of supercharging system 10 and turbocharging system 30, respectively for comparison to the inventive embodiments of FIGS. 2A-9. As shown in FIG. 1A, filtered air from air filter 18 is fed via line 20 into supercharger 22 which is driven by the engine 12 via drive mechanism 28. The charged air output from the supercharger 22 is supplied to the intercooler 26 via line 24. It is appreciated that in numerous embodiments of the present invention, an intercooler is not present. The cooled supercharged air is then supplied via the intake manifold 16 to both of the intake valves (I) of each of the cylinders 14 of engine 12. In a similar manner in FIG. 1B, filtered air from air filter 18 is fed via line 20 into turbocharger 32 which utilizes heated exhaust gas from the exhaust valves (E) via exhaust manifold 34. The charged air output from the turbocharger 32 is supplied to the intercooler 26 via line 24. The cooled supercharged air is then supplied via the intake manifold 16 to both of the intake valves of each of the cylinders 14 of engine 12.

Figure 2A:
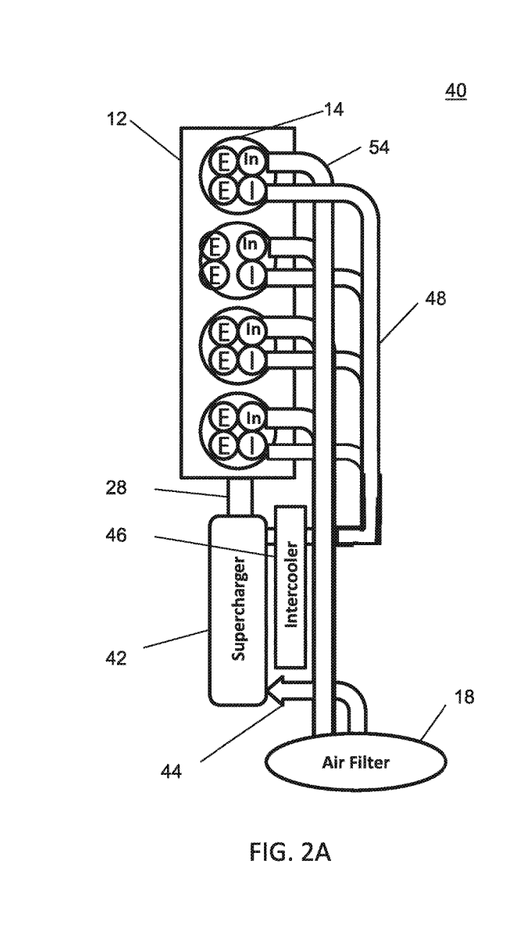
FIGS. 2A and 2B are schematic diagrams of a partial supercharging system according to embodiments of the invention.
Figure 2B:
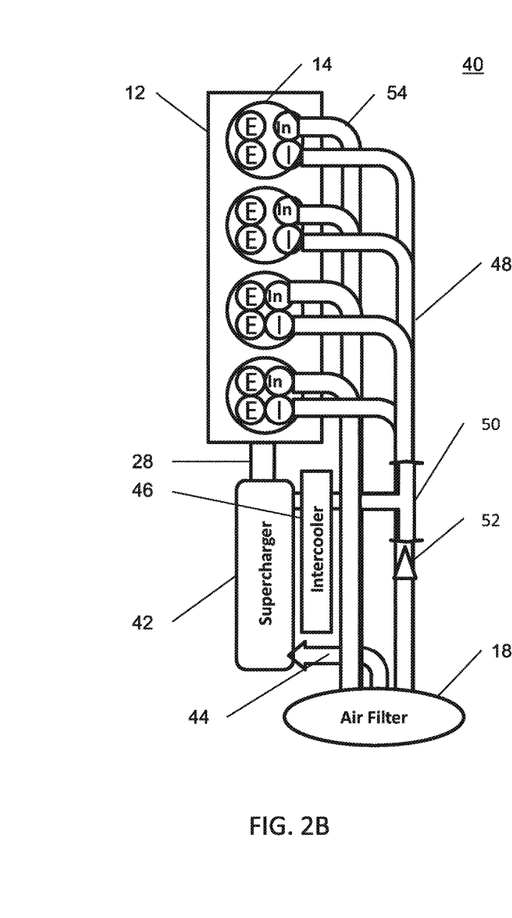

FIGS. 2A and 2B are schematic diagrams of a partial supercharging system 40 according to embodiments of the invention both without (FIG. 2A) and with a switching mechanism 50 (FIG. 2B). The intake manifold using partial forced induction splits the induction flow into two paths: (1) a naturally aspirated intake manifold path 54 connected to the naturally aspirated ports and intake valves (In), and (2) a "forced induction" intake manifold path 48 connected to the forced induction intake ports and valves (I). Note that the supercharger 42 and intercooler 46 with partial supercharging are schematically depicted as smaller in size than their conventional counterparts in FIG. 1A, since they handle reduced air flow. In FIG. 2A an engine driven supercharger 42 receives air from the air filter 18 and supplies compressed air through the intercooler 46 to the forced induction intake manifold path 48. In FIG. 2B a switching mechanism 50 as used herein illustratively includes a switching valve, or alternatively a check valve detailed with respect to reference numeral 52, located upstream of the force induction intake manifold path, can alternatively connect to uncompressed air from the air filter 18, or direct compressed air from the engine driven supercharger 42, through the intercooler 46 to the forced induction intake manifold path 48. It is appreciated that in some inventive embodiments the switching mechanism is located within the forced induction portion of the engine and mounted therein. It is further appreciated that the switching mechanism 50 in other inventive embodiments is positioned upstream of the supercharger 42 relative to air flow to yield an operative inventive device that retains the benefits of the present invention (not shown).

Figure 3A:
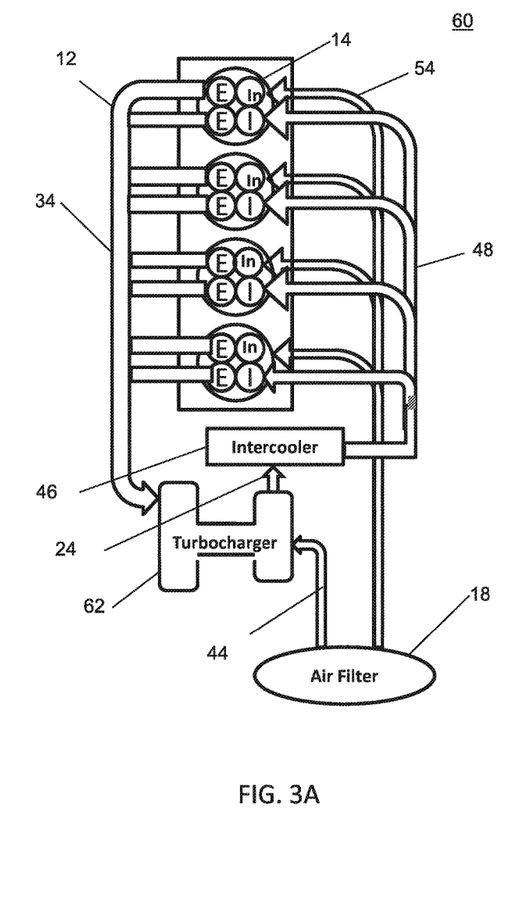
FIGS. 3A and 3B are schematic diagrams of a partial turbocharging system according to embodiments of the invention.
Figure 3B:
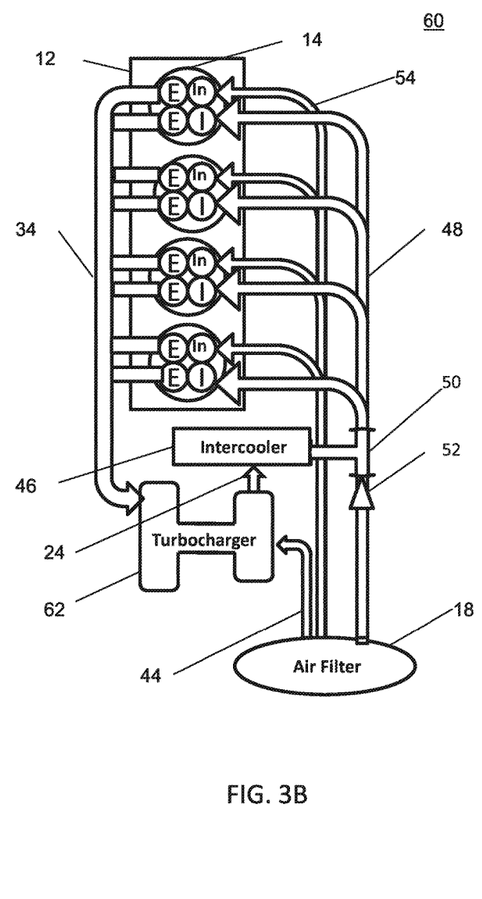

FIGS. 3A and 3B are schematic diagrams of a comparison of a partial turbocharging system 60, where the partial forced induction is applied in a similar manner to the partial supercharging described in FIGS. 2A and 2B. The intake manifold using partial forced induction splits the induction flow into two paths: (1) a naturally aspirated intake manifold path 54 connected to the naturally aspirated ports and intake valves (In), and (2) a "forced induction" intake manifold path 48 connected to the forced induction intake ports and valves (I). Note that the turbocharger 62 and intercooler 46 with partial forced induction are schematically depicted as smaller in size than their conventional counterparts of FIG. 1B since they handle reduced airflow. In FIG. 3A the turbocharger 62 receives air from the air filter 18 and supplies compressed air through the intercooler to the forced induction manifold path 48. In FIG. 3B, a switching mechanism 50 as used herein illustratively includes a switching valve, or alternatively a check valve 52, located upstream of the force induction intake manifold path 48, can alternatively connect to uncompressed air from the air filter 18, or direct compressed air from the turbocharger 62, through the intercooler 46 to the forced induction intake manifold path 48. It is appreciated that in some inventive embodiments the switching mechanism is located within the forced induction portion of the engine and mounted therein. It is further appreciated that the switching mechanism 50 in other inventive embodiments is positioned upstream of the turbocharger 42 relative to air flow to yield an operative inventive device that retains the benefits of the present invention (not shown).

Figure 4A:
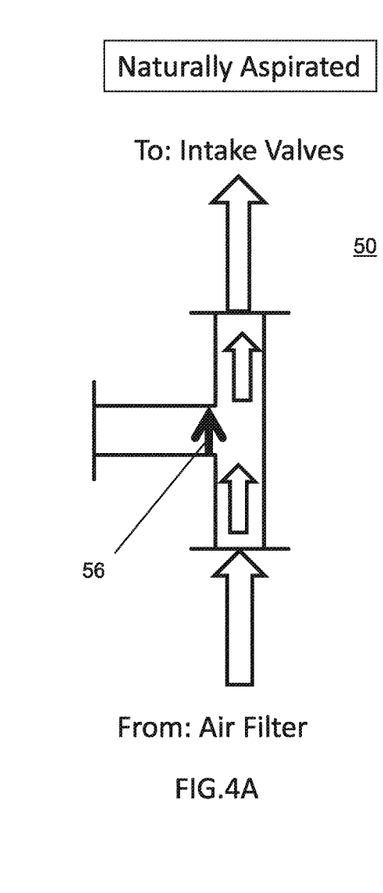
FIGS. 4A and 4B are schematic diagrams of a switching valve in induction paths for naturally aspirated and under boost conditions according to embodiments of the invention.
Figure 4B:
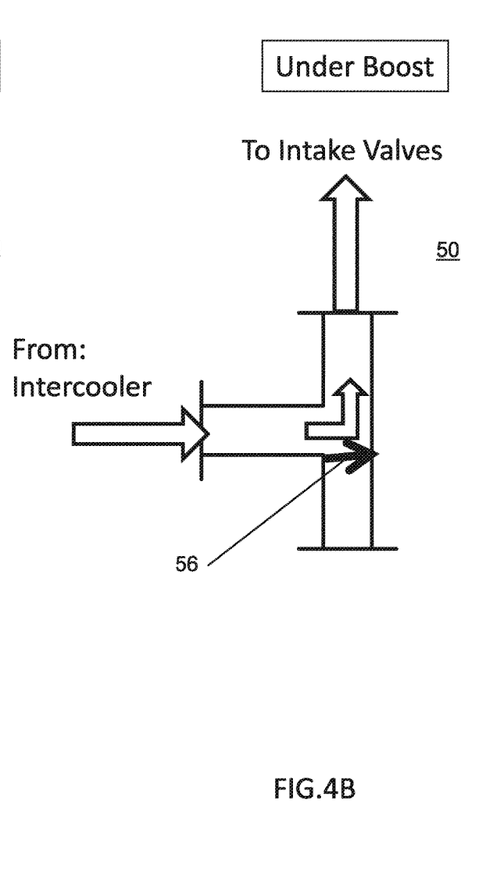

FIGS. 4A and 4B are schematic diagrams of a switching valve 50 in induction paths for naturally aspirated and under boost conditions according to embodiments of the invention. The switching valve 50 incorporates a valve gate 56. In the naturally aspirated mode, as shown in FIG. 4A, the valve gate 56 closes off the intake path from the supercharger and intercooler, and simultaneously opens the path from the air filter to the forced induction manifold. Under boost, as shown in FIG. 4B, the valve gate 56 is switched to close the path from the air cleaner, and opens the path from the supercharger and intercooler to the forced induction manifold. Note that the switching valve 50 can be either passively or actively operated. For passive operation, the valve gate 56 is spring loaded to close the path from the supercharger and intercooler in the naturally aspirated mode. Under boost, pressure from the supercharger overcomes the spring bias pressure on the valve gate 56, opening the connection to the forced induction manifold, while simultaneously closing the path from the air filter. For an actively operated switching valve 50, the valve gate 56 is moved from the normally closed naturally aspirated position to the boost position by a signal from the electronic engine controller, where the signal is predominantly derived by power demand deduced from manifold pressure.

Figure 5A:
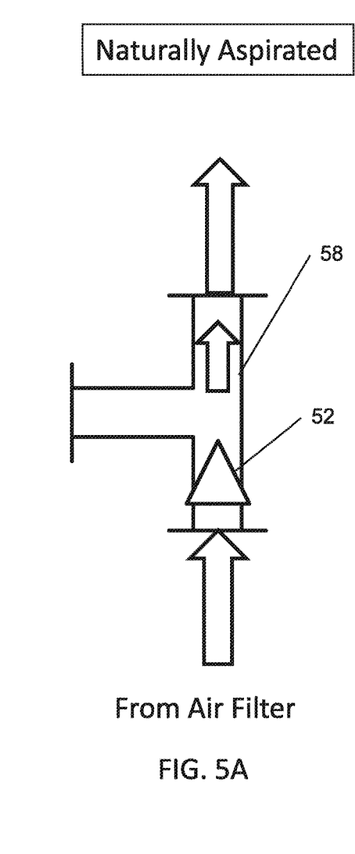
FIGS. 5A and 5B are schematic diagrams of alternative check valve induction paths for naturally aspirated and under boost conditions according to embodiments of the invention.
Figure 5B:
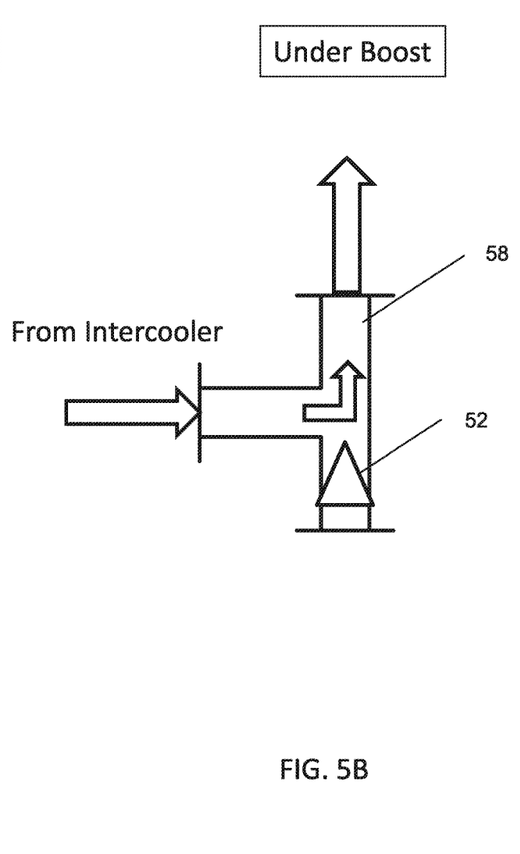

FIGS. 5A and 5B are schematic diagrams of alternative check valve 52 for induction paths for naturally aspirated and under boost conditions according to embodiments of the invention. The check valve 52 is an alternative to the switching valve 50 described in FIGS. 4A and 4B, where check valve 52 is incorporated within a "T" or "Y" shaped connector 58 between the air filter 18, intercooler 46, and forced induction intake manifold path 48. The check valve 52 is located within the connector 58 such that it freely allows induction air to pass from the air filter 18 to the forced induction intake manifold port 48 when in the naturally aspirated mode. When the compressor (e.g., supercharger 42) provides boost, however, the check valve 52 prevents the boosted induction charge from reverting to the air filter 18, thus directing it to the forced induction intake manifold path 48. Typical check valves that can be employed include flapper valves and reed valves.

Figure 6A:
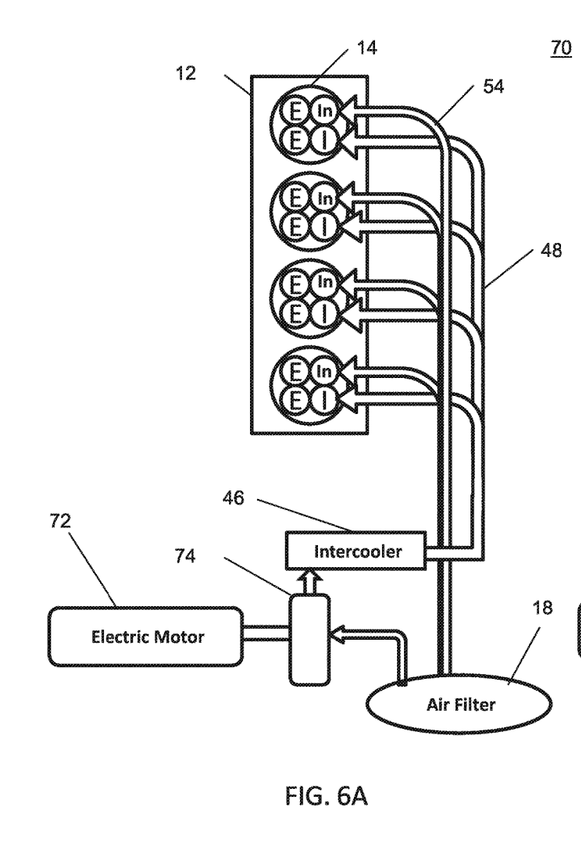
FIGS. 6A and 6B are schematic diagrams of an electrical partial forced induction system according to embodiments of the invention.
Figure 6B:
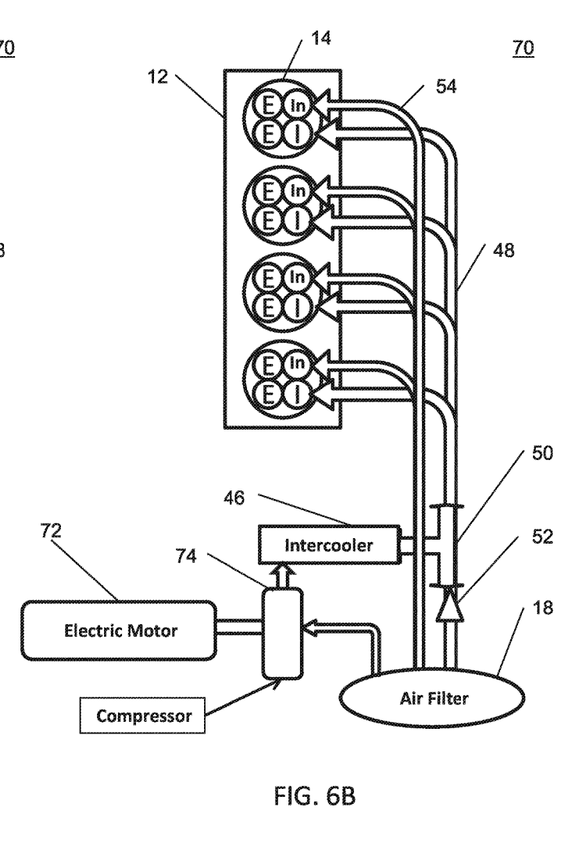

FIGS. 6A and 6B are schematic diagrams of an electrical partial forced induction system 70 according to embodiments of the invention that operates in a similar manner to the partial supercharging described in FIGS. 2A and 2B, respectively. As shown in FIG. 6A, the intake manifold using partial forced induction splits the induction flow into two paths: (1) a naturally aspirated intake manifold path 54 connected to the naturally aspirated ports and intake valves (In), and (2) a "forced induction" intake manifold path 48 connected to the forced induction intake ports and valves (I). The compressor 74, driven by an electric motor 72, receives air from the air filter 18 and provides compressed air through the intercooler 46 to the forced induction intake manifold path 48. As with the supercharger and turbocharger applications, the compressor 74 and intercooler 46 are smaller than that required for a conventional application due to the reduced airflow requirements. The compressor 74 can be either positive displacement, or centrifugal, although centrifugal is probably more efficient in most cases. The smaller compressor 74 allows sizing of a less powerful motor 72, making such an application more commercially viable. In FIG. 6B, a switching mechanism 50 as used herein illustratively includes a switching valve, or alternatively a check valve 52, located upstream of the force induction intake manifold path, can alternatively connect to uncompressed air from the air filter 18, or direct compressed air from the compressor 74 driven by an electric motor 72, through the intercooler 46 to the forced induction intake manifold path 48. As with the supercharger and turbocharger applications, the compressor 74 and intercooler 46 are smaller than that required for a conventional application due to the reduced airflow requirements. It is appreciated that in some inventive embodiments the switching mechanism is located within the forced induction portion of the engine and mounted therein. In certain embodiments the electric motor is connected to an electric power supply system of other regenerative engine systems, such as electrified stop/start, or hybrid powertrains. It is further appreciated that the switching mechanism 50 in other inventive embodiments is positioned upstream of the compressor 74 relative to the airflow to yield an operative device that retains the benefits of the present invention (not shown).

Figure 7:
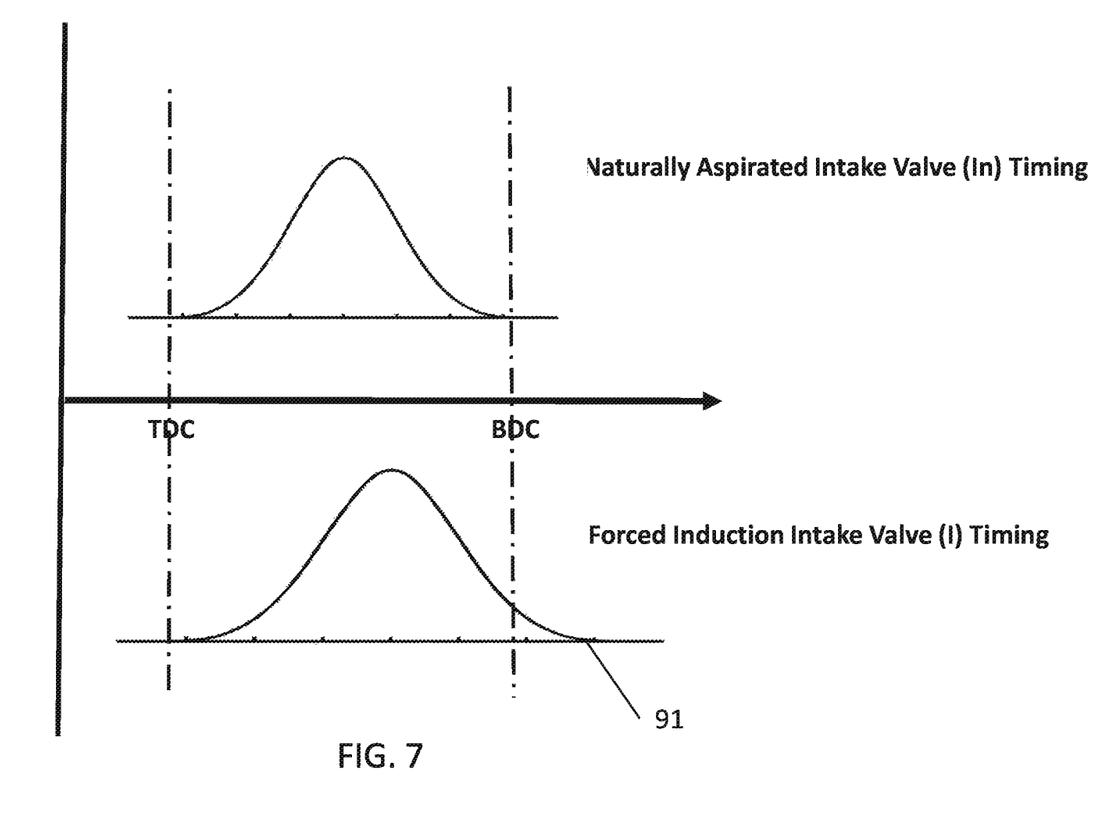
FIG. 7 is a valve timing schematic depicting the delayed forced induction intake valve (I) closing compared to the naturally aspirated intake valve (In) closing according to an embodiment of the invention.

In an embodiment of this invention that utilizes direct fuel injection, and multiple intake valves with independently variable timing, intake and exhaust valve timing can be optimized in the same manner as conventional engines under normally aspirated operating conditions. Under boost, however, the timing of the intake valves is split according to whether the intake valve is connected to the naturally aspirated intake manifold, or forced induction intake manifold. As depicted in FIG. 7, both intake valves open at the same time (nominally Top Dead Center (TDC), however, under boost, intake valve timing is changed so that the naturally aspirated valve closing (nominally Bottom Dead Center (BDC)) precedes the timing of the "forced induction" valve; such that the forced induction valve has a later closing 91—"capturing" the pressurized induction charge.

Partial Forced Induction can be applied to internal combustion engines without fully independently variable valve timing. Such an approach takes advantage of the transport time lag associated with the intake gas dynamics. Partial forced induction will work with intake valves that have identical timing, but the amount of boost achieved may be limited by the transport time between the boosted intake valve and naturally aspirated intake valve. Boost pressures are limited by the time it takes for the boosted intake charge to escape through the open naturally aspirated intake valve, in a condition called reversion.

Figure 8:
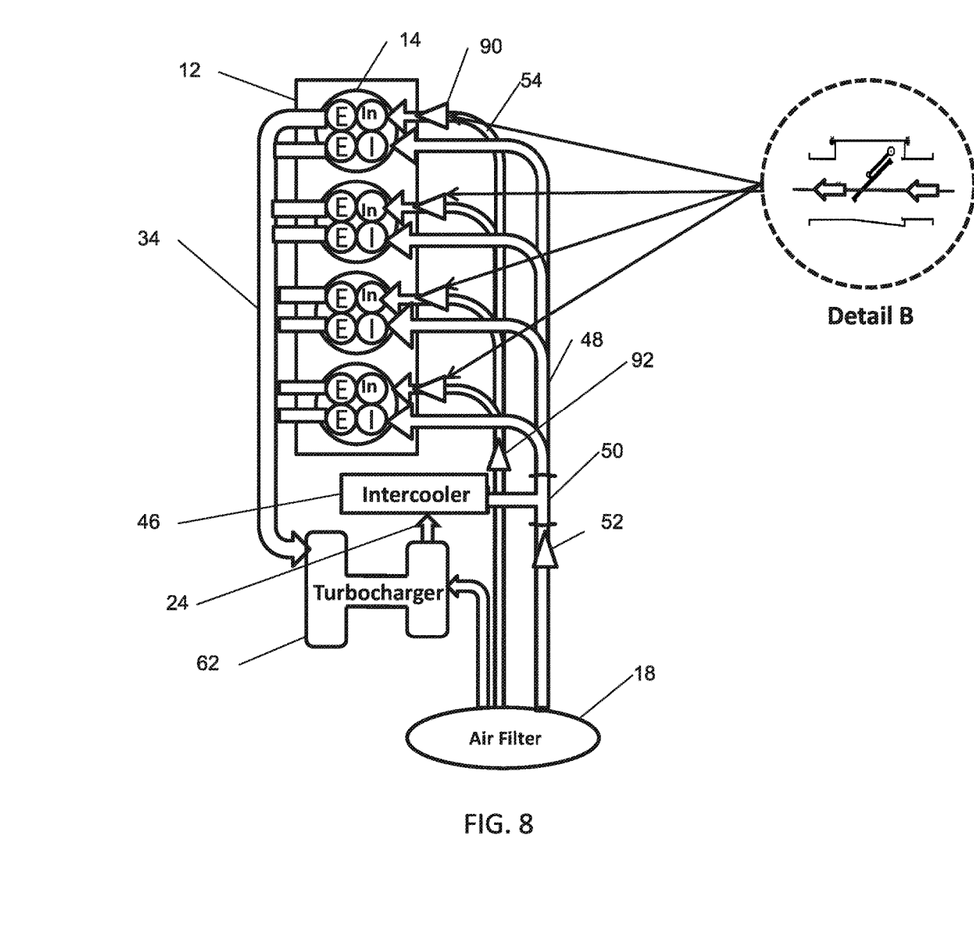
FIG. 8 is a schematic of a partial turbocharging system with anti-reversion check valves, and a Detail B view of an anti-reversion check valve schematic according to an embodiment of the invention; and The detailed description explains the preferred embodiments of the invention

Referring to FIG. 8, this reversion of pressurized air through the naturally aspirated intake vale can be minimized by the incorporation of anti-reversion check valves 90 located in the naturally aspirated intake valve ports (In) or individual naturally aspirated intake manifold runners. In FIG. 8, partial forced induction of a turbocharger application is depicted. Check valves 90 (for example, flapper or reed valves) are used to prevent backflow of the pressurized intake charge into the naturally aspirated intake manifold, thus capturing the boosted intake charge within the combustion chamber. Alternatively, a manifold anti-reversion check valve 92 can be incorporated in the naturally aspirated intake manifold upstream of the individual runners, as shown. Note that "cam phasing" used on many of today's engines can still be incorporated with either approach.

Another method of applying forced induction valve timing is to incorporate intake cams with split lobes that actuate the valves. As depicted in FIG. 7, both intake valves open at the same time (nominally Top Dead Center (TDC), however, intake valve timing is changed so that the naturally aspirated valve closing (nominally Bottom Dead Center (BDC)) precedes the timing of the "forced induction" valve; such that the forced induction valve has a later closing 91—"capturing" the pressurized induction charge. Traditional cam phasing can still be employed with this approach. This split lobe cam approach can also be used in concert with the anti-reversion check valves.

The foregoing description is illustrative of particular embodiments of the invention, but is not meant to be a limitation upon the practice thereof. The following claims, including all equivalents thereof, are intended to define the scope of the invention.

The invention claimed is:

1. A partial forced induction system, said system comprising:
   one or more combustion engine cylinders with each engine cylinder having a first intake valve and a second intake valve;
   a first intake manifold providing a naturally aspirated intake manifold path between an air filter to each of said first intake valves of said one or more combustion engine cylinders;
   a second intake manifold having a switching valve providing an alternating connection between either said air filter or a source of forced induction to each of said second intake valves of said one or more combustion engine cylinders, said source of forced induction configured to supply a pressurized induction charge into the one or more combustion engine cylinders;
   wherein said switching valve is passively actuated by a pressure differential when a pressurized induction charge is supplied by said source of forced induction to overcome and open a closed connection to said source of forced induction, and simultaneously close the path to the naturally aspirated air source; and
   wherein said switching valve is passively set to open at a higher pressure differential than the naturally aspirated air source when pressurized induction charge is supplied.

2. The system of claim 1 wherein the system is used in combination with a variable intake valve timing or a variable exhaust valve timing.

3. A partial forced induction system, said system comprising:
   one or more combustion engine cylinders with each engine cylinder of said one or more combustion engine cylinders having a first intake valve and a second intake valve;
   a first intake manifold providing a naturally aspirated intake manifold path between an air filter to each of said first intake valves of said one or more combustion engine cylinders;
   a second intake manifold having a switching valve providing an alternating connection between either said air filter or a source of forced induction to each of said second intake valves of said one or more combustion engine cylinders, said source of forced induction configured to supply a pressurized induction charge into the one or more combustion engine cylinders; and wherein said switching valve is actuated by signals from an electronic engine controller to switch from a closed connection to said forced induction source, and an open connection to said air filter that is a naturally aspirated air source, to an open connection from said forced induction source and a closed connection to the naturally aspirated air source.

4. The system of claim 3 wherein the system is used in combination with a variable intake valve timing or a variable exhaust valve timing.

5. A partial forced induction system, said system comprising:
   one or more combustion engine cylinders with each engine cylinder of said one or more combustion engine cylinders having a first intake valve and a second intake valve;
   a first intake manifold providing a naturally aspirated intake manifold path between an air filter to each of said first intake valves of said one or more combustion engine cylinders;
   a second intake manifold having a check valve providing an alternating connection between either said air filter or a source of forced induction to each of said second intake valves of said one or more combustion engine cylinders, said source of forced induction configured to supply a pressurized induction charge into the one or more combustion engine cylinders; and wherein said check valve is located upstream of a "T" or "Y" connection between said air filter that is a naturally aspirated source, said forced induction source, and said second intake manifold that provides an induction intake manifold path, where said check valve allows naturally aspirated induction from said naturally aspirated source, but under a pressurized induction charge condition said check valve prevents back flow to said naturally aspirated source, thus directing pressurized air to said forced induction intake manifold path.

6. The system of claim 5 wherein the system is used in combination with a variable intake valve timing or a variable exhaust valve timing.

7. A partial forced induction system, said system comprising:
   one or more combustion engine cylinders with each engine cylinder of said one or more combustion engine cylinders having a first intake valve and a second intake valve;
   a first intake manifold having one or more anti-reversion check valves that provides a naturally aspirated intake manifold path between an air filter to each of said first intake valves of said one or more combustion engine cylinders, where each of said one or more anti-reversion check valves is used to prevent backflow of a pressurized intake charge into the naturally aspirated intake manifold path;
   a second intake manifold having a check valve providing an alternating connection between either said air filter or a source of forced induction to each of said second intake valves of said one or more combustion engine cylinders, said source of forced induction configured to supply a pressurized induction charge into the one or more combustion engine cylinders; and wherein said check valve is located upstream of a "T" or "Y" connection between said air filter that is a naturally aspirated source, said forced induction source, and said second intake manifold that provides an induction intake manifold path, where said check valve allows naturally aspirated induction from said naturally aspirated source, but under a pressurized induction charge condition said check valve prevents back flow to said naturally aspirated source, thus directing pressurized air to said forced induction intake manifold path.

8. The system of claim 7 wherein said one or more anti-reversion check valves are flapper or reed valves.

9. The system of claim 7 wherein a single anti-reversion check valve of each of said one or more anti-reversion check valves is positioned at each of said first intake valves.

10. The system of claim 7 wherein a single anti-reversion check valve of said one or more anti-reversion check valves is positioned in the naturally aspirated intake manifold path upstream of a set of individual runners connected to said first intake valves.

11. The system of claim 7 wherein the system is used in combination with a variable intake valve timing or a variable exhaust valve timing.

\* \* \* \* \*